Jan. 28, 1964    A. E. FARR ETAL    3,119,469
ROTARY VISCOUS FLUID DAMPER
Filed May 27, 1960    3 Sheets-Sheet 1
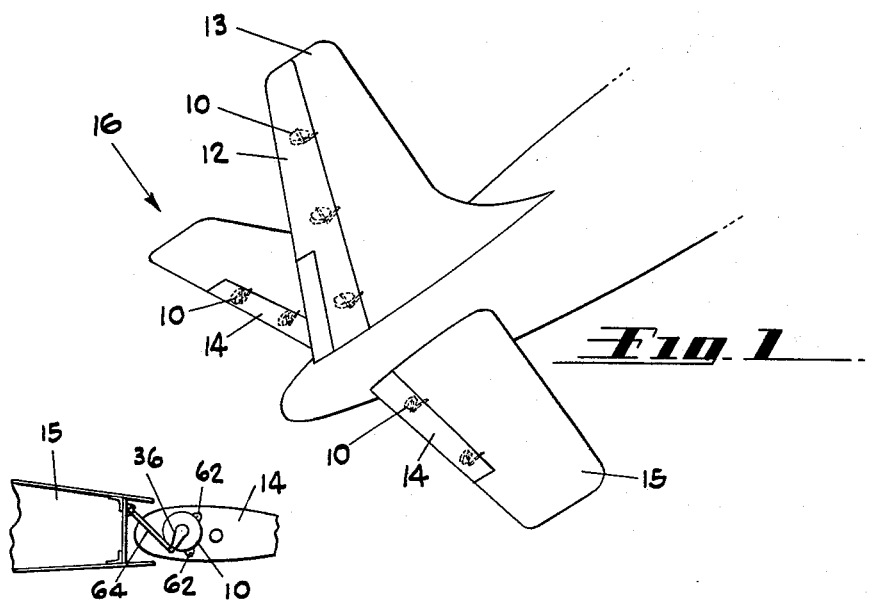
Fig. 1
Fig. 2
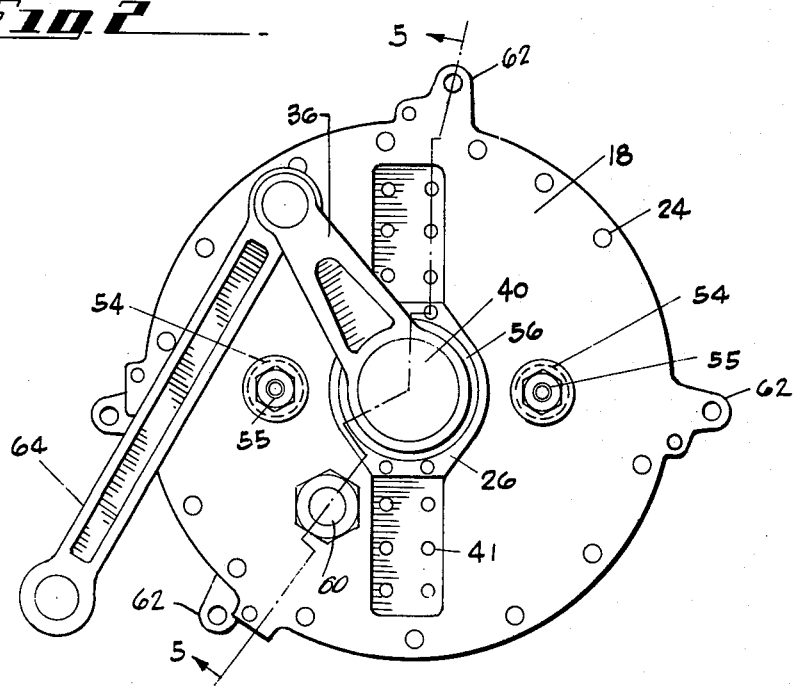
Fig. 4
INVENTORS
ALTON E. FARR
WALTER L. GRABOWSKI
HENRY G. HOEHMANN
BY Edwin Coates
ATTORNEY

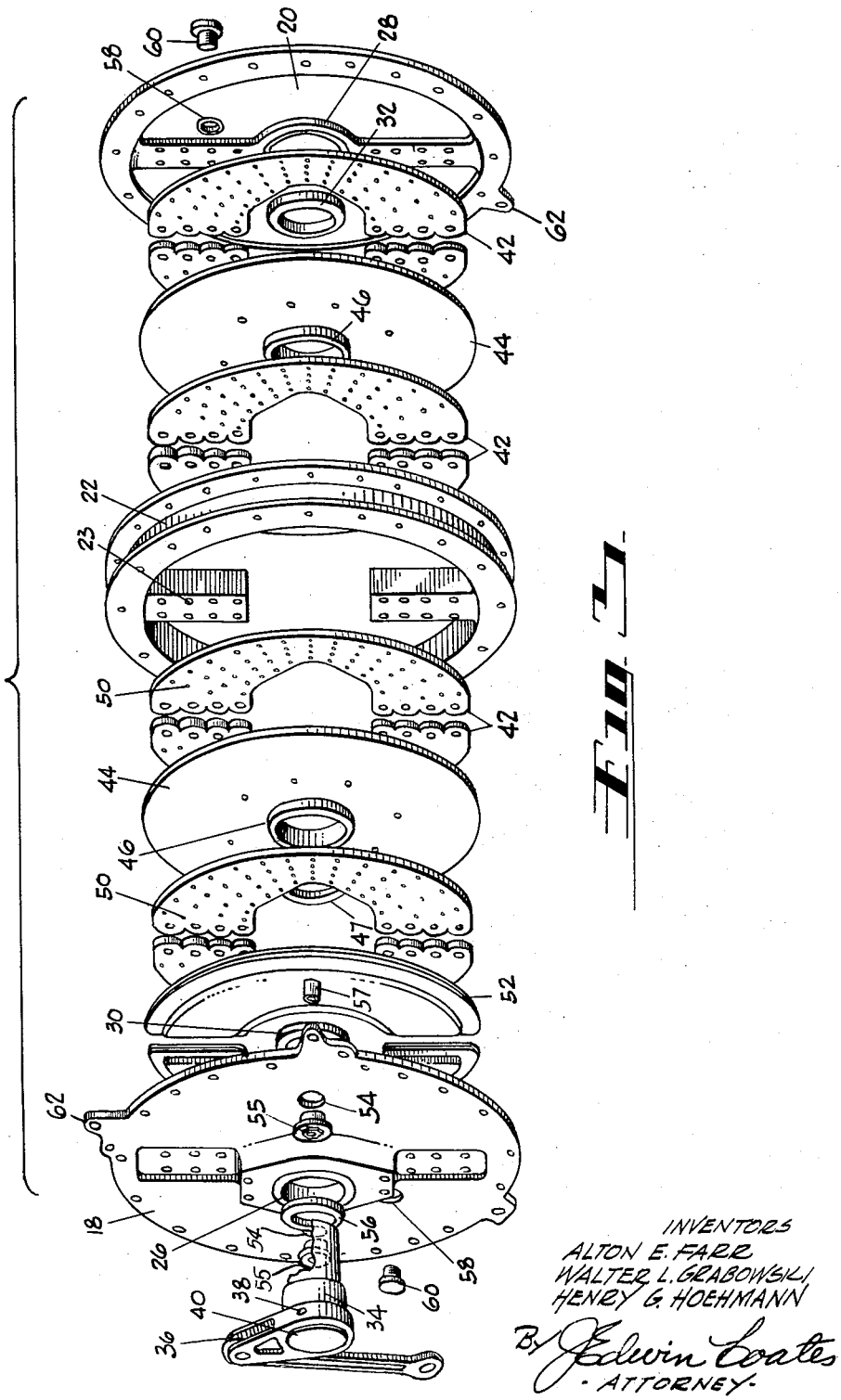

Jan. 28, 1964 A. E. FARR ETAL 3,119,469
ROTARY VISCOUS FLUID DAMPER
Filed May 27, 1960 3 Sheets-Sheet 3

INVENTORS
ALTON E. FARR
WALTER L. GRABOWSKI
HENRY G. HOEHMANN
By Edwin Coates
ATTORNEY United States Patent Office 3,119,469
Patented Jan. 28, 1964

3,119,469
ROTARY VISCOUS FLUID DAMPER
Alton E. Farr, Rolling Hills, and Walter L. Grabowski and Henry G. Hoehmann, Los Angeles, Calif., assignors to Douglas Aircraft Company, Inc., Santa Monica, Calif.
Filed May 27, 1960, Ser. No. 90,900
3 Claims. (Cl. 188—90)

Our invention relates to viscous type fluid dampers and more particularly to vane fluid dampers which include means for automatic compensation for variations in viscosity to provide a relatively constant damping force over a substantial temperature range.

All fluids possess viscosity; therefore they exhibit certain frictional phenomena when relative motion of the fluid layers occurs. Viscosity is due fundamentally to cohesion and interaction between fluid molecules and, as flow occurs, these effects appear as tangential or shear stresses between the moving fluid layers. In a viscous fluid, momentum exchange due to molecular agitation is small compared to the cohesive forces between the molecules and thus viscosity is primarily dependent on the magnitude of the cohesive forces. Since these forces decrease rapidly with increase of temperature, liquid viscosities and shear resistance decrease as temperature increases.

A viscous damper derives its retarding force or damping force from the shear stresses developed in the moving of fluid layers between surfaces that embrace these layers. To provide these retarding forces, a viscous damper generally comprises housing or casing containing a viscous fluid, a rotatable shaft extending into the housing, a plurality of vanes attached to the shaft and rotatable in the viscous fluid and a plurality of relatively stationary members or disks attached to the housing and interleaved with the vanes in the viscous fluid. To develop the damping force, the relative rotation of the shaft and housing is resisted and retarded by the resistance to shearing of the fluid between the interleaved disks and vanes. This damping force is theoretically proportional to the viscosity of the fluid, the areas of the vanes, and the relative velocity of the vanes, and is inversely proportional to the spacing between the adjacent interleaved vanes and the disks.

From the above, it is apparent that if a constant damping force is desired from a viscous damper which is subjected to varying temperature conditions, either the temperature of the viscous fluid must remain constant or the spacing between the relatively rotatable vanes and the stationary members must be varied.

It has been found desirable to use viscous fluid dampers to damp the relative motion of aircraft elevators and rudders. However, since aircraft elevators and rudders are subjected to varying temperatures as the aircraft changes altitude or geographic location, it has been found necessary to provide a viscous damper which will provide a relatively constant damping force over an extended temperature range. For aircraft use the preferred damper temperature operating range is in the order of 160° F. to −65° F.

To achieve this design parameter, it has been found impractical to pressurize or insulate the elevator and rudder assemblies to maintain the damper fluid at a constant temperature. However, it has been found practical and desirable to incorporate into a viscous fluid damper a means for automatically compensating for variation in viscosity resulting from temperature changes. To achieve this, the present invention, in one form, utilizes bi-metallic elements as the relatively stationary disks. These elements are composed of two opposed dissimilar metallic materials; one material having a relatively high coefficient of thermal expansion and the other material having a relatively low coefficient of thermal expansion. The use of materials of different thermal expansion characteristics to produce temperature compensation whereby a uniform force of torque is obtained over a varying temperature range, is generally known. However, heretofore, this method has been used to provide a substantially uniform torque in fluid couplings or brakes and has not been used in viscous dampers.

Relatively heavy and bulky mechanical means such as springs, adjustable plates and abutments have been used in viscous dampers to manually vary the spacing between the relatively rotatable vanes and the stationary disks. These means have provided manual adjustment of the spacing between the disks and vanes but have had no automatic adjustment feature. Because of this, their use on aircraft has proved unsatisfactory. To utilize mechanical means to manually compensate for viscosity changes in aircraft rudder and elevator dampers would introduce into the aircraft additional weight and bulk which would make the use of such mechanisms prohibitive.

In the present invention, automatic thermal responsive stationary members or disks are used in combination with a vane type fluid damper for the purpose of varying the clearance between the vanes of rotors and the disks or stators as a function of temperature. By use of automatic means, the present invention does not introduce additional weight or bulk into the damper and obviates one of the primary difficulties inherent in devices utilizing mechanical compensation.

In its presently preferred embodiment, the invention comprises a generally cylindrical housing filled with a viscous fluid, a relatively rotatable shaft extending into said housing and defining therewith an annular cylindrical space, a plurality of relatively stationary bi-metallic disks mounted on the housing, and a plurality of relatively rotatable vanes attached to the shaft and interleaved with the bi-metallic disks.

Other advantages of the invention will hereinafter become more fully apparent from the following description of the annexed drawings, which illustrate a preferred embodiment and a modification thereof, and wherein:

FIG. 1 is a fragmentary perspective view of an aircraft tail section showing the typical installation of the present invention;

FIG. 2 is an elevational view, partly in section, of a portion of the horizontal stabilizer and elevator shown in FIG. 1 showing the damper of the present invention located within the elevator structure and connected by appropriate linkage to the horizontal stabilizer;

FIG. 3 is an expanded view of the presently preferred embodiment of this invention;

FIG. 4 is a plan view of the presently preferred embodiment of this invention showing the mounting tabs, bladder, and chamber ports;

Figure 5:
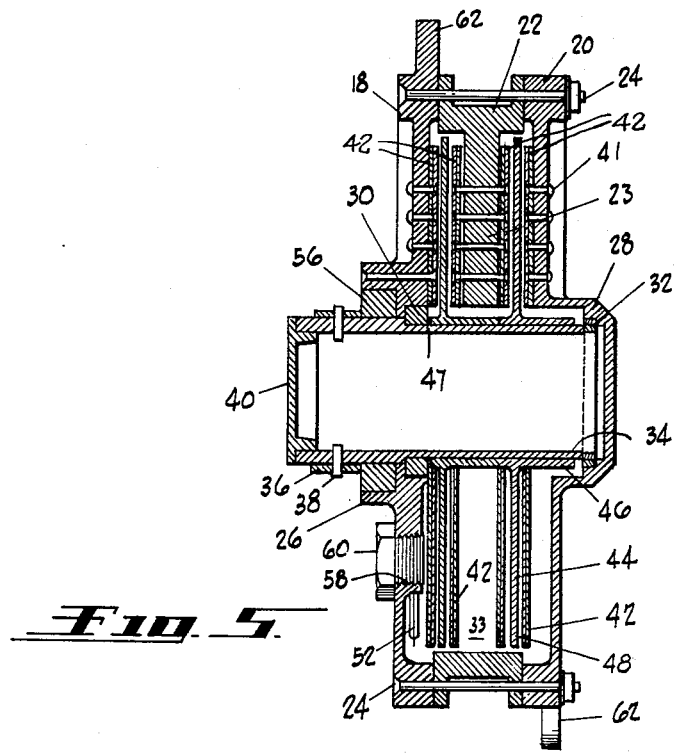
FIG. 5 is a cross sectional view taken at 5—5 in FIG. 3.

Referring now to the drawings, wherein like reference characters designate like or corresponding parts throughout the several views, there is shown in FIGS. 1 and 2 a type of installation for which the present invention is especially adapted but not specifically limited thereto. Here, a plurality of damper structures 10 of the present invention are mounted within the structure of control surfaces, such as the rudder 12 and elevators 14, and connected by proper linkage 64, of a typical aircraft, to the structure of the tail section 16, such as the vertical and horizontal stabilizers 13, 15 respectively to provide a constant damping force on the control surfaces.

As best seen in FIGS. 3 and 5, the damper structure comprises a relatively rotatable concentric cylindrical element or casing formed by rigid front and rear walls 18 and 20 and a spacer ring 22. The spacer ring has radially inwardly projecting mounting tabs 23. Located near the outer edge of the casing or housing are a plurality of apertures containing conventional screws and nuts 24. Near its avis, the front wall, seen at the left in FIG. 5, has an annular bearing and sealing flange 26. Likewise, near its axis, the rear wall 20 has a bearing flange 28. Contained within each of the said flanges 26, 28 are bearings 30, 32 respectively. Extending into the housing and journaled in each of the bearings 30, 32 is a relatively rotatable concentric hollow shaft 34. The housing and shaft thereby define a cylindrical space 33. The shaft 34 extends outward from the front wall 18 sufficiently to enable a crank 36 to be fastened thereto by conventional means 38. The shaft is enclosed by a cap 40 at its exposed end to prevent foreign materials from entering the hollow portion of the shaft.

Mounted by rivets 41 or the like to the tabs 23 on the spacer ring 22 and to the front and rear walls 18, 20 respectively are a plurality of viscosity variance compensating bimetallic stator elements 42. Extending into the cylindrical space 33 are a plurality of rotor disks or vanes 44. Said vanes have a hub portion 46 by which the vanes are mounted by conventional means on the shaft 34. The positioning of the vanes within the space 33 defines a plurality of zones therein. Said vanes are interleaved between the stator members or the disks 42 thereby defining in said zones a plurality of shear regions 48. To properly maintain the spacing between the stationary disks 42 and the rotors 44, a shim 47 is positioned between the bearing 30 and the adjacent rotor hub 46.

One or more filler openings 58 are provided in the front and rear walls 18 and 20 respectively of the housing through which the housing may be filled with a suitable viscous fluid. These openings are normally closed by plugs 60.

As best shown in FIG. 3, a series of radially located holes or apertures 50 are provided in the bimetallic stators. These holes are of sufficient diameter to permit the viscous fluid to readily pass into and out of the shear regions 48 as the stators deflect under varying temperature conditions.

A pressure differential can exist between the inside and outside of the damper housing because of changes in fluid volume. In order to eliminate this pressure difference, flexible pressure expansible members or bladders 52 are attached to the front wall 18 and extend into the cylindrical space 33. These bladders 52 are ported to the outside through ports 54 (FIG. 4) which contain bleeder valves 55. Each of the bleeder valves 55 is mounted to one of the nipples 57 extending through each of the ports 54. The nipples 57 have a flanged portion (not shown) which is bonded to the interior surface of the bladders 52 and contains a longitudinal port adapted to permit air to vent from the bladders 52 through the bleeder valves 55. The bladders 52 are expansibly mounted within chamber 33 by the attaching of the bleeder valves 55 to the extremity of the nipples 57. The bladder provides a barrier to allow outside air pressure to fill the internal void left by fluid contraction at low temperatures. To prevent leakage of the fluid to the exterior of the housing, a spring loaded sealing ring 56 is provided between the shaft 34 and the bearing 30 and the sealing flange 26.

To produce automatic compensation for variations in viscosity, the stators 42 are composed of laminations of temperature expansible materials having a wide variance in thermal expansion characteristics. The laminations could consist of layers of a material such as aluminum or the like which has a relatively high thermal coefficient of expansion and "Invar" or the like which has a relatively low thermal coefficient of expansion.

In the preferred embodiment of the damper of this invention, the bimetallic stator 42 is composed of a lamination of a sheet of high coefficient of expansion material such as a composition of nickel, chrome and carbon or the like and a sheet of "Invar" or the like and has a design temperature range of operation of approximately —65° F. to 160° F. With this bimetallic composition, the temperature change mentioned will produce a deflection of the tip of the stator disks 42 that is approximately ten times the initial width of the shear region 48 at room temperature or approximately 75° F. The laminated construction of the disks 42 causes the deflected shape of the disks to be either inwardly or outwardly convexed relative to the adjacent rotors 44. For an increase in temperature, and a resultant decrease in viscosity of the fluid, the disks will distort into an inwardly convex shape, that is, inward toward the rotors 44, thereby reducing the width of the shear region 48. For a decrease in temperature, the disks will be outwardly convexed, thus increasing the width of the shear region 48, thereby compensating for the resultant increase in fluid viscosity.

In order to secure optimum results, the bimetallic materials selected for the stator disks preferably should be so correlated with the viscosity characteristics of the viscous fluid used that there is provided a constant and uniform damping force.

In the presently preferred embodiment, the damper is filled with a silicone fluid or the like. The above described bimetallic composition of the stator disk 42 has been chosen so that its thermal expansion characteristics will cooperate with the viscosity properties of the silicone fluid to produce a relatively constant damping force over a temperature range of approximately —65° F. to 160° F.

Referring now to FIG. 4 the front wall 18 and rear wall 20 of the housing are shown provided with ears or tabs 62 whereby the housing may be mounted on a support or structure and link 64 is fastened to the end of the crank 36. The damper of the present invention may be used as a shock absorber on vehicles or aircraft, or on other devices for controlling the relative motion of two structures. As shown in FIG. 2, when the damper is used on aircraft, the housing is secured by tabs 62 to the structure of a control surface, such as the elevator 16, and the crank 36 is connected by suitable linkage 64 to the aircraft structure, such as the horizontal stabilizer 15, so that during flight of the aircraft relative movements between the aircraft and the surface may be damped and controlled by a relatively constant damping force.

Figure 6:
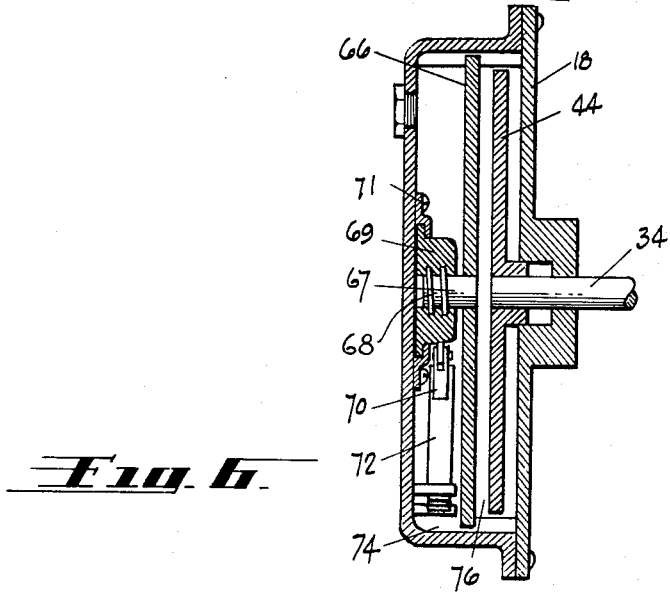
FIG. 6 is a sectional view of a modified form of the presently preferred embodiment of this invention.

FIG. 6 shows a modified arrangement in which, instead of employing a bimetallic stator, the stator 66 is composed of a single metallic material. However, to provide automatic compensation for variations in viscosity due to changes in temperature the stator 66 is splined into transverse grooves 74 in the casing or housing and is mounted to a shaft 67 which has a threaded portion 68. The threaded portion 68 is mated with an internally threaded block 69. This block is rotatably mounted to the casing by means of journal member 71. Adjacent to the block 69 and fastened to the casing is a bimetallic element 72, which is connected to the block 69 by appropriate linkage 70.

The mode of operation of the modified form of the present invention as shown in FIG. 6 is essentially the same as that described above. A variation in temperature surrounding the structure causes the bimetallic element 72 to expand or contract. This motion raises or lowers link 70, causing block 69 to rotate to a limited degree. Since the block is prevented from moving axially, the rotation produces axial movement of shaft 67, thus increasing or decreasing the dimension of the shear space 76.

Although the above description of the damper structure of the present invention has been limited to the use of this invention to vehicles such as aircraft, the invention need not be limited thereto for it is susceptible to changes in form, detail and application within the scope of the appended claims.

We claim:
1. A damper structure comprising: a housing; a shaft journaled in said housing, said shaft and housing defining an annular cylindrical space containing viscous fluid, said fluid having a viscosity which varies with variations in temperature; a plurality of disk-like rotatable vanes mounted to and extending from said shaft through said cylindrical space to intersect at an angle the axis of rotation of said shaft thereby defining a plurality of zones; and a plurality of viscosity-variance compensating bimetallic disks mounted on said housing and interleaved in said plurality of zones thereby defining a plurality of shear regions, a pair of said disks being arranged for cooperation with each of said vanes, said disks comprising laminations of dissimilar bimetallic materials adapted to deflect under varying temperature conditions and vary the extent of the shear regions on each lateral side of said vanes whereby the viscosity resistance of the fluid between and in engagement with vanes and disks will result in a relatively constant retarding and damping of the rotation of said vanes.

2. A damper structure comprising: a housing; a shaft journaled in said housing, said shaft and housing defining an annular cylindrical space containing viscous fluid, said fluid having a viscosity which varies with variations in temperature; a plurality of disk-like vanes mounted to and extending radially from said shaft into said cylindrical space to intersect at a right angle to the axis of rotation of said shaft thereby defining a plurality of zones; and a plurality of viscosity-variance compensating bimetallic disks mounted on said housing along a line substantially normal to said axis and substantially intersecting said axis and interleaved in said plurality of zones thereby defining a plurality of shear regions, a pair of said disks being arranged for cooperation with each of said vanes, said disks comprising laminations of dissimilar bimetallic materials adapted to deflect under varying temperature conditions and vary the extent of the shear region on each lateral side of said vanes whereby the viscosity resistance of the fluid between and in engagement with vanes and disks will result in a relatively constant retarding and damping of the rotation of said vanes.

3. A damper structure comprising: a housing; a shaft journaled in said housing, said shaft and housing defining an annular cylindrical space containing viscous fluid, said fluid having a viscosity which varies with variations in temperature; a plurality of disk-like rotatable vanes mounted to and extending from said shaft through said cylindrical space substantially normal to the axis of rotation of said shaft thereby defining a plurality of zones; a plurality of generally semicircular viscosity-variance compensating bimetallic disks mounted on said housing along a line substantially normal to said axis and substantially intersecting said axis and interleaved in said plurality of zones thereby defining a plurality of shear regions, said disks comprising laminations of dissimilar bimetallic materials adapted to deflect under varying temperature conditions to vary the extent of the shear regions, whereby the viscosity resistance of the fluid between and in engagement with the vanes and disks will result in a relatively constant retarding and damping of the rotation of said vanes.

References Cited in the file of this patent
UNITED STATES PATENTS

| | | |
|---|---|---|
| 1,238,447 | Severy | Aug. 28, 1917 |
| 1,718,175 | Nilson | June 18, 1929 |
| 2,046,723 | Brownscombe | July 7, 1936 |
| 2,514,137 | O'Connor | July 4, 1950 |
| 2,661,915 | O'Connor | Dec. 8, 1953 |
| 2,661,917 | O'Connor et al. | Dec. 8, 1953 |
| 2,699,846 | Pitman et al. | Jan. 18, 1955 |
| 2,775,317 | Sinisterra | Dec. 25, 1956 |
| 2,881,868 | Frykman | Apr. 14, 1959 |
| 2,952,337 | Coffin | Sept. 13, 1960 |
| 2,955,471 | Schwartz | Oct. 11, 1960 |
| 2,959,252 | Jamieson | Nov. 8, 1960 |

FOREIGN PATENTS

| | | |
|---|---|---|
| 484,667 | Canada | July 8, 1952 |